United States Patent [19]

Limbacher

[11] Patent Number: 4,947,976
[45] Date of Patent: Aug. 14, 1990

[54] RELEASE ARRANGEMENT FOR A MOTOR VEHICLE CLUTCH

[75] Inventor: Bernhard Limbacher, Niederwerrn, Fed. Rep. of Germany

[73] Assignee: Fichtel & Sachs AG

[21] Appl. No.: 328,090

[22] Filed: Mar. 23, 1989

[30] Foreign Application Priority Data

Mar. 26, 1988 [DE] Fed. Rep. of Germany ....... 3810369

[51] Int. Cl.$^5$ ............................................. F16D 19/00
[52] U.S. Cl. ................................. 192/98; 192/99 R; 192/99 S
[58] Field of Search ................... 192/98, 99 S, 99 R

[56] References Cited

U.S. PATENT DOCUMENTS

| | | | |
|---|---|---|---|
| 2,093,799 | 9/1937 | Bemis | 192/98 |
| 3,333,664 | 8/1967 | Chapaitis | 192/99 R |
| 3,357,529 | 12/1967 | Binder et al. | 192/98 |
| 3,815,715 | 6/1974 | Maucher | 192/98 |
| 4,029,186 | 6/1977 | De Gennes | 192/98 |
| 4,267,913 | 5/1981 | Ernst et al. | 192/99 S |
| 4,648,500 | 3/1987 | Parzefall | 192/99 S |
| 4,718,528 | 1/1988 | Caron et al. | 192/99 S |
| 4,742,902 | 5/1988 | Leigh-Monstevens | 192/98 |
| 4,789,052 | 12/1988 | Gay et al. | 192/98 |

FOREIGN PATENT DOCUMENTS

| | | | |
|---|---|---|---|
| 2701999 | 7/1977 | Fed. Rep. of Germany | 192/98 |
| 2615257 | 11/1988 | France . | |
| 1476663 | 6/1977 | United Kingdom . | |

*Primary Examiner*—Leslie A. Braun
*Assistant Examiner*—Nicholas Whitelaw
*Attorney, Agent, or Firm*—Toren, McGeady & Associates

[57] ABSTRACT

The invention relates to a release system in which a release bearing is prefitted in a release fork in order to ensure mutual fixing together with the gear during transport.

8 Claims, 2 Drawing Sheets

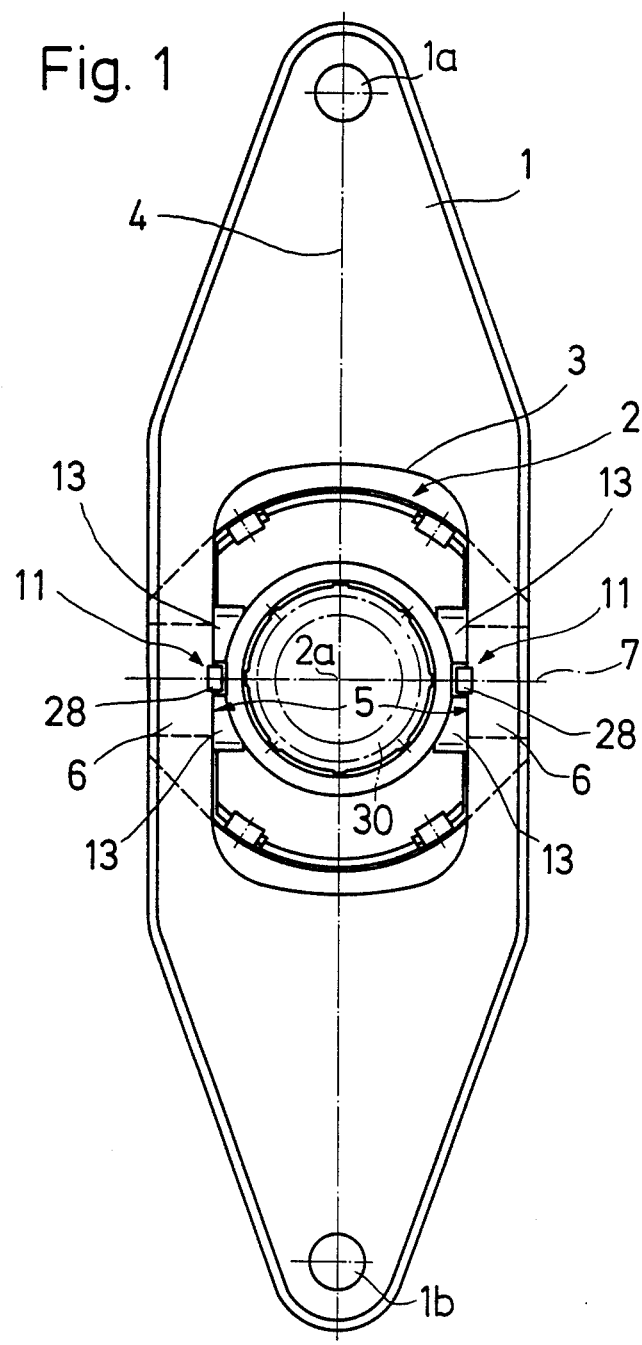

RELEASE ARRANGEMENT FOR A MOTOR VEHICLE CLUTCH

BACKGROUND OF THE INVENTION

The invention relates to a release arrangement for a clutch arranged in the drive line between engine and gear of a motor vehicle.

From U.S. Pat. No. 4,648,500, a release system, especially for a motor vehicle clutch, is known which comprises a release fork which is mounted pivotably at its one end on a housing part, is connected at its other end with an actuating device, and is penetrated in an opening by the gear shaft and partially by the release bearing in a region lying therebetween.

In this known release system the release fork comprises an opening in order to guarantee sufficient space for the passage of the sliding sleeve of the release bearing and of the gear shaft.

To an increasing extent however the gears and the internal combustion engines for a car are manufactured at different locations and joined together with the body only in final assembly. The release fork and also the release bearing are components which are to be associated with the gear. They are also to be prefitted on the gear before assembly with the internal combustion engine. Before the fitting of gear and engine however the release bearing is merely axially pushed loosely with the sliding sleeve on to a tube on the gear.

It is therefore the problem of the present invention to prevent loss of the release bearing during transport of the gear by means which are simple in production and handling.

SUMMARY OF THE INVENTION

In accordance with the invention two mutually opposite retaining noses are provided on the housing of the release bearing. The noses lie on a line of connection turned through 90° in relation to the longitudinal center line of the release fork and engage radially resiliently and with axial spacing behind the edge of the opening in the release fork. The noses are of simple construction and hold the release bearing on the release fork, already fitted on the gear, so that for the one part it cannot be lost or damaged during transport and for the other part it does not obstruct immediate fitting, since it is already situated in the correct position. Due to the axial spacing of the retaining noses from the edge of the opening in the release fork it is further guaranteed that after the fitting of gear and engine the retaining noses exert no influence of any kind upon the engagement and disengagement operations, since they then no longer rest on the release fork.

As further advantageous feature it is proposed that a lateral guidance is provided between the housing of the release bearing and two parallel-extending defining edges of an opening in the release fork, this lateral guidance taking place by means of corresponding flanges of the release bearing while furthermore these flanges have an interruption —for the passage of the retaining noses— in the region of the line of connection.

The retaining noses are here formed from resilient sheet metal strips.

Where a self-centering release bearing is used, in which at least the flange intended for the supporting of the release fork and of the release bearing is produced from synthetic plastics material, it is proposed to arrange the sheet metal strips in one piece with the retaining noses on an annular sheet metal part which is arranged on the inner side of the flange, the sheet metal strips penetrating the flange in appropriate openings and reaching as far as the actuation side. Thus with this combined component the possibility is provided of obtaining a wear-resistant abutment face for the self-centering release bearing, the sheet metal part being automatically held in its position by the pressure application force of the self-centering bearing and the centering being effected by the openings, through which the sheet metal strips reach. The sheet metal part with the sheet metal strips thus fulfills several different functions at the same time.

The openings in the flange for the passage of the sheet metal strips are made larger radially inwards than the material thickness of the sheet metal strips, so that these are not limited in the radially inward direction in their spring movement. Thus it is possible to carry out the fitting of release bearing and release fork easily. For this purpose the retaining noses have threading-in slopes.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will next be explained in greater detail by reference to an example of embodiment. Individually:

FIG. 1 shows the elevation of a release fork with release bearing from the gear side;

Figure 2:
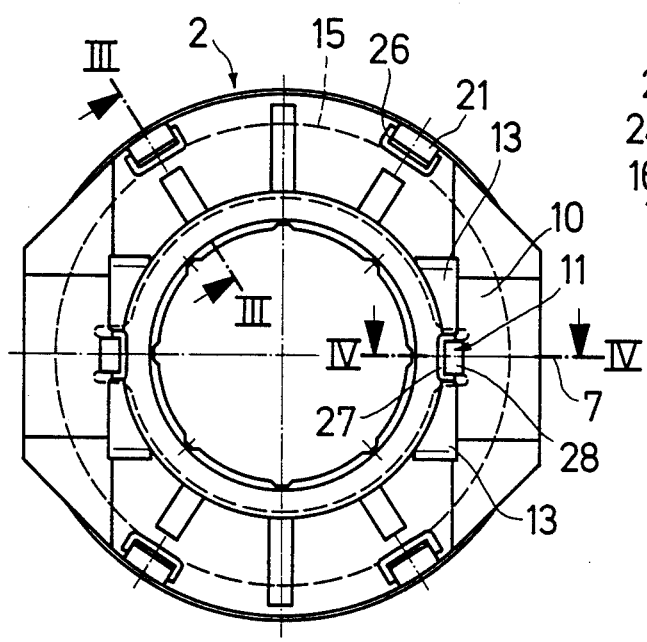
FIG. 2 the elevation of the release bearing alone, in enlarged representation.

FIG. the partial section III—III according to FIG. 2;

FIG. the partial section IV—IV according to FIG. 2.

DESCRIPTION OF PREFERRED EMBODIMENTS

FIG. 1 shows the overall arrangement, consisting of a release fork 1 and a release bearing 2, the axis of rotation of which is entered at 2a. The release fork 1 and the release are represented from the gear side. The release fork 1 is mounted pivotably, in a manner not further illustrated, in its one end region 1a on the gear and charged in the opposite end region 1b by a clutch actuation device. The center line 4 passes through both regions. Lying between them the release bearing 2 is arranged, which is supported on the actuating elements of the clutch (not shown). The release bearing 2 is axially displaceably guided with its internal diameter on a tube-like component 30 (not shown) of the gear. It is loaded only with the actuation force by the release lever 1. The release lever 1 comprises an opening 3 which comprises two defining edges 5 extending parallel, which are arranged parallel to the center line 4. Guide parts of the release bearing 2 penetrate the opening 3 and center themselves in the direction of the center line 4 on the two defining edges 5. As explained in greater detail with reference to FIGS. 2 to 4, these guide components are made as flanges 13. The connection line 7 proceeds perpendicularly of the center line 4 through the center of the release bearing 2. Along this line 7 of connection there is contact between the release fork 1 and the release bearing 2. For this purpose the release bearing 2 is provided with domed portions 10 and the release fork 1 is made plane in this region. The plane face is designated by 6 in FIG. 1. In the region of this line 7 of connection the flanges 13 are interrupted and retaining noses 11 point out of the release bearing 2 axially in the direction towards the gear and engage behind the plane faces 6 on the defining edges 5 in the region of the connection line 7. For simpler fitting the retaining noses 11 comprise threading-in slopes 28 and are made resilient perpendicularly of the center line 4, with a radially outwardly directed spring force.

Figure 3:
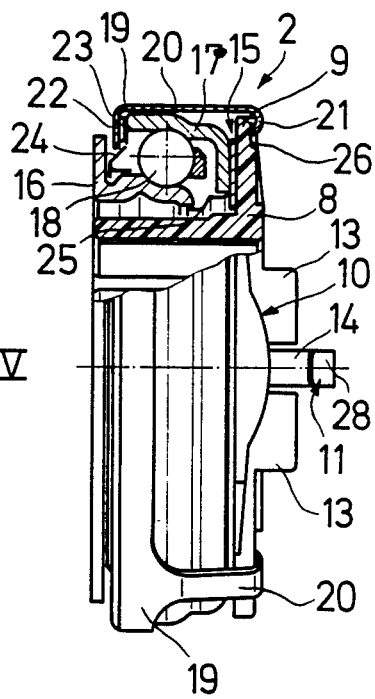
Figure 4:
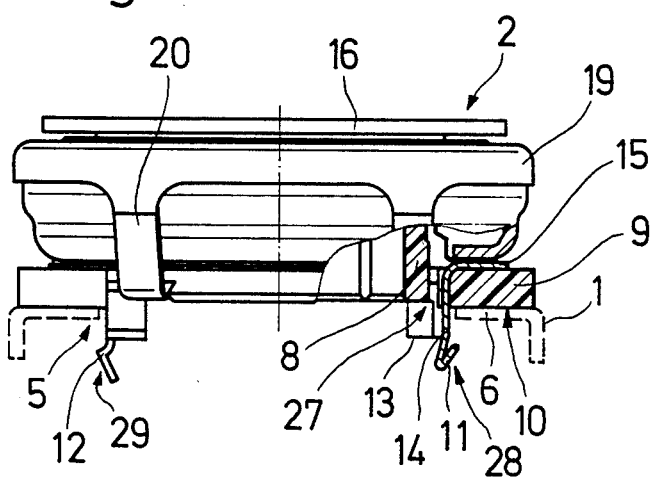

The construction of the release bearing and the arrangement of the retaining noses appear in detail from FIGS. 2 to 4. FIGS. 2 and 3 show an elevation and partial section of a release bearing 2. This comprises a sliding sleeve 8 for fitting on a guide (not shown). In the present case the sliding sleeve 8 is produced in one piece from synthetic plastics material with a radially extending flange 9. The radial flange 9 comprises the two domed portions 10, the apex line of which coincides with the connection line 7. This apex line is the region of contact in relation to the plane faces 6 of the release fork 1. The domed portions 10 are directed towards the gear. They are limited in the direction towards the center of the sliding sleeve 8 by flanges 13 which serve for the lateral guidance in relation to the defining edges 5 of the release fork 1. In the region of intersection of the flanges 13 with the connection line 7, openings 27 are provided through which the retaining noses 11 are conducted. The openings 27 penetrate the flange 9 and continue in the flanges 13 as radially outwardly open grooves, and widen radially inwards in the region of the flange 9. The formation of these openings 27 and the passage of the retaining noses 11 also appear especially from the right half of FIG. 4. The retaining noses 11 form the end regions of sheet metal strips 14 which are formed integrally on a sheet metal part 15 of substantially annular washer form. This sheet metal part 15 may be seen in section from FIGS. 3 and 4 and is visible in chain lines in elevation in FIG. 2. The sheet metal part 15 lies against the inner side of the flange 9 and is held at this point by the self-centering release bearing. The construction of this bearing appears especially from FIG. 3. It consists of a rotating inner race ring 16, a stationary outer race ring 17 and a set of balls 18. This rolling bearing is braced by means of a holder 19 through the corrugated spring 23 in the direction of the flange 9—with interposition of the sheet metal part 15. The holder 19 comprises a flange 22 with axially extending retaining arms 20 which end on the side of the flange 9 facing the gear in claws 21 and are hooked there into a depression 26 of the flange 9. Due to this arrangement the rolling bearing is centered in its position by the axial clamping force, but can adjust itself radially in a certain range according to any axial offsetting between gear and engine. This radial displacement action of the rolling bearing in relation to the flange 9 takes place through the intermediary of the sheet metal part 15. Thus the outer race ring 17 of the rolling bearing has a plane, non-wearing contact face. In the present case a sealing washer 25 is also interposed between outer race ring 17 and sheet metal part 15, likewise a sealing washer 24 is interposed between outer race ring 17 and corrugated spring 23.

In FIG. 4 two different forms of embodiment of retaining noses 11 and 12 respectively are represented, where in the one case the sheet metal tab forming the threading-in slope 28 faces in the direction towards the release bearing 2 and in the other case (threading-in slope 29) it faces away from the release bearing 2. In both cases provision is made by the threading-in slopes 28 and 29 so that in the insertion of the release bearing 2 into the release fork 1 the threading-in slopes run up on the defining edges 5 of the release fork 1 and after guiding through the retaining noses hold the release bearing 2 non-losably on the release fork 1. The sheet metal strips 14 here serve as spring elements which both hold the retaining noses in the correct position and also permit dismantling. The retaining noses 11 and 12 are here arranged so that in subsequent operation they are spaced in the axial direction from the defining edges 5 and thus cannot influence operation.

While specific embodiments of the invention have been shown and described in detail to illustrate the application of the inventive principles, it will be understood that the invention may be embodied otherwise without departing from such principles.

What I claim is:

1. Release arrangement for a clutch arranged in a drive line between an engine and a gear of a motor vehicle, comprising
    a release bearing (2) with a bearing part (16) rotatable in operation about a rotation axis (2a), a bearing part (17) not rotatable in operation and a bearing housing (8, 9, 19) guiding the non-rotatable bearing part (17),
    a release fork (1) having on mutually opposite sides of the rotation axis (2a) one end (1a) for pivotable mounting on a housing of the gear and another end (1b) for a force introduction of an actuating device, and rests on the bearing housing (8, 9, 19) on both sides of a line (4) of connection of the two ends (1a, 1b) on opposite sides of the rotation axis (2a),
    wherein the bearing housing (8, 9, 19) carries, on both sides of the connection line (4) of the two ends (1a, 1b) of the release fork (1), retaining noses (11, 12) which are resilient substantially radially with respect to the rotation axis (2a), which noses engage with axial play behind the release fork (1) on a side axially remote from the release bearing (2).

2. Release arrangement according to claim 1, wherein the release fork (1) comprises the two ends (1a, 1b) an opening (3) with guide edges (5), parallel to the line (4) of connection of the ends (1a, 1b), on both sides of the rotation axis (2a), wherein the bearing housing (8, 9, 19) engages in the opening (3) of the release fork (1) and comprises guide flanges (13) on both sides of the rotation axis (2a), which guide the bearing housing (8, 9, 19) non-rotatably along the connection line (4) of the ends (1a, 1b), wherein the release fork (1) rests laterally of the guide flanges (13) on the bearing housing (8, 9, 19) and wherein the retaining noses (11, 12) are arranged in the region of the guide flanges (13).

3. Release arrangement according to claim 2, wherein the retaining noses (11, 12) pass through the opening (3) of the release fork (1).

4. Release arrangement according to claim 2, wherein a sheet metal shaped part (15) annularly enclosing the rotation axis (2a) and from which resilient sheet metal strips forming the retaining noses (11, 12) protrude, is held on the bearing housing (8, 9, 19).

5. Release arrangement according to claim 4, wherein the bearing housing (8, 9, 19) comprises a sleeve (8) for displaceable guidance of the release bearing (2) on a guide extension (30) of the gear housing and a flange (9)

protruding radially from the sleeve (8), the flange having, on a side facing axially to the release fork (1), on both sides of the rotation axis (2a) near the guide flanges (13), domed abutment faces (10) formed for the release fork (1), and which flange comprises on the axially opposite side facing the non-rotatable bearing part (17) of a rolling bearing (16, 17) guided radially movably on the housing (8, 9, 19) and wherein the sheet metal shaped part (15) has essentially the form of an annular disc on which the retaining noses (11, 12) are integrally formed and which is arranged axially between the support face of the flange (9) and the non-rotating bearing part (17).

6. Release arrangement according to claim 5, wherein the retaining noses (11, 12) are formed on the region of the internal circumference of the annular disc and engage through openings (27) of the bearing housing (8, 9, 19) in the opening (3) of the release fork (1).

7. Release arrangement according to claim 6, wherein the openings (27) of the bearing housing (8, 9, 19) lead through the flange (9) and continue in the guide flanges (13) as radially outwardly open grooves, the openings (27) widening towards the rotation axis in the region of the flange (9).

8. Release arrangement according to claim 1, wherein the retaining noses (11, 12) are provided with threading-in slopes (28, 29).

* * * * *